United States Patent
Stühler et al.

(10) Patent No.: US 6,203,935 B1
(45) Date of Patent: Mar. 20, 2001

(54) METHOD FOR OPERATING A FUEL CELL SYSTEM AND FUEL CELL SYSTEM

(75) Inventors: Walter Stühler, Hirschaid; Herbert Stenger, Burgthann; Harry Gellert, Effeltrich, all of (DE)

(73) Assignee: Siemens Aktiengesellschaft, Muenchen (DE)

( * ) Notice: Subject to any disclaimer, the term of this patent is extended or adjusted under 35 U.S.C. 154(b) by 0 days.

(21) Appl. No.: 09/266,438

(22) Filed: Mar. 11, 1999

Related U.S. Application Data

(63) Continuation of application No. PCT/DE97/01891, filed on Aug. 29, 1997.

(30) Foreign Application Priority Data

Sep. 11, 1996 (DE) ............................................. 196 36 908

(51) Int. Cl.$^7$ .................................................. H01M 8/04
(52) U.S. Cl. .................. 429/13; 429/17; 429/26
(58) Field of Search .................... 429/13, 17, 26, 429/12, 20, 24, 19

(56) References Cited

U.S. PATENT DOCUMENTS 5,192,627  3/1993  Perry, Jr. et al. ....................... 429/17
5,976,722 * 11/1999  Muller et al. ........................... 429/13

OTHER PUBLICATIONS

Published International Application No. 97/10619 (Müller et al.), dated Mar. 20, 1997.
Japanese Patent Abstract No. 06333583 (Toshihiro), dated Dec. 2, 1994.

\* cited by examiner

*Primary Examiner*—Stephen Kalafut
*Assistant Examiner*—Tracy Dove
(74) *Attorney, Agent, or Firm*—Herbert L. Lerner; Laurence A. Greenberg; Werner H. Stemer

(57) ABSTRACT

A fuel cell system having a fuel cell block is operated by compressing an operating agent for the fuel cell block with a liquid ring compressor. After compressing the operating agent, water is separated from the operating agent in an apparatus for water separation. The fuel cell block is cooled with the water and, after the cooling, at least a portion of the water is fed back into the apparatus for water separation. This measure reduces the number of components which form the fuel cell system.

5 Claims, 1 Drawing Sheet

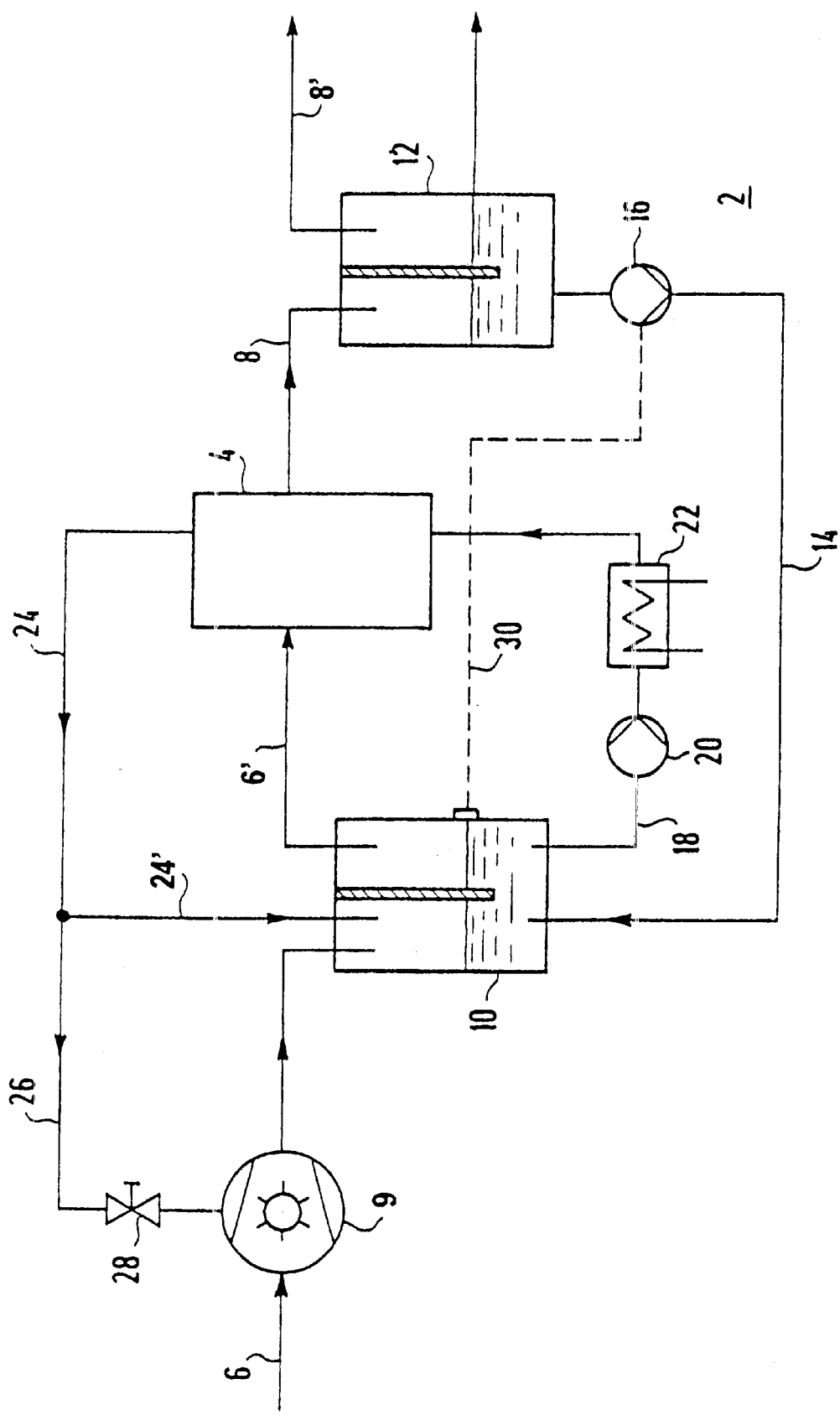

METHOD FOR OPERATING A FUEL CELL SYSTEM AND FUEL CELL SYSTEM

CROSS-REFERENCE TO RELATED APPLICATION

This is a continuation of copending International Application PCT/DE97/01891, filed Aug. 29, 1997, which designated the United States.

BACKGROUND OF THE INVENTION

FIELD OF THE INVENTION

The invention relates to a method for operating a fuel cell system, and a fuel cell system.

It is known that, during the electrolysis of water, the water molecules are broken down by electric currents into hydrogen and oxygen. In a fuel cell, this process is reversed. During the electrochemical combination of water and hydrogen to form water, electric current is produced with a high efficiency and, if pure hydrogen is used as the combustion gas, the electrochemical combination is effected without the emission of pollutants or carbon dioxide. Even with technical combustion gases, such as natural gas or coal gas, and using air or air enriched with $O_2$ instead of pure oxygen, a fuel cell produces a considerably smaller amount of pollutants and less $CO_2$ than other energy producing devices which operate with fossil energy sources. The technical implementation of the principle of the fuel cell has led to widely differing solutions, with different types of electrolytes and with operating temperatures between 80° C. and 1000° C.

A fuel cell block, which is also called a "stack" in the technical literature, is, as a rule, composed of a number of fuel cells stacked on top of each other.

The moistening and compression of the process gases before they enter the fuel cell block is problematic, since the vaporization enthalpy for moistening must be provided. Apparatuses having a membrane moistening or water injection after compression, are for example known from German Patent DE 43 18 818.

In addition, International Application WO 97/10619 discloses a method for operating a fuel cell system having at least one fuel cell block, in which at least one operating agent/process gas for the fuel cell block is compressed by means of a liquid ring compressor. After compression, water is separated from the operating agent and is fed via a product water container to the cooling circuit of the fuel cell system.

A disadvantage of the methods known from the prior art is that a complex structure of the fuel cell system is required for performing various method steps, such as for example separating water from a process gas for the fuel cell block, and providing the cooling water for the fuel cell block and an operating liquid for the liquid ring compressor. In other words, a complex structure means that individual components have to be provided in the fuel cell system for the various method steps which results in a high financial outlay.

Furthermore, a relatively large number of components in the fuel cell system also increases the requirements for controlling and regulating the individual components.

SUMMARY OF THE INVENTION

It is accordingly an object of the invention to provide a method for operating a fuel cell system, which overcomes the above-mentioned disadvantages of the heretofore-known methods of this general type and, in which the number of components required in the fuel cell system is reduced, and thus the costs for the fuel cell system is decreased while, at the same time, a method-relevant advantage is achieved. A further object of the invention is to provide a fuel cell system for carrying out the method of the invention.

With the foregoing and other objects in view there is provided, in accordance with the invention, a method for operating a fuel cell system having at least one fuel cell block, the method which comprises:

compressing at least one operating agent for a fuel cell block with a liquid ring compressor;

separating, subsequently water from the operating agent in an apparatus for water separation;

cooling the fuel cell block with the water; and feeding back, subsequently at least part of the water into the apparatus for water separation.

In accordance with another mode of the invention, at least part of a process water from the fuel cell block is used for cooling the fuel cell block.

With the objects of the invention in view, there is also provided a fuel cell system, comprising:

at least one fuel cell block;

at least one liquid ring compressor for compressing an operating agent for the fuel cell block;

an apparatus for water separation connected between the liquid ring compressor and the fuel cell block in a feed path for supplying the fuel cell block with the operating agent; and a line provided between the fuel cell block and the apparatus, the line feeding at least part of the water, back into the apparatus after the water flows through the fuel cell block for cooling the fuel cell block.

In accordance with another feature of the invention, a process water separator is connected to the fuel cell block, and a further line for feeding process water from the process water separator into the apparatus for water separation is provided.

In accordance with yet another feature of the invention, a further line branches off from the line and opens into the liquid ring compressor for feeding part of the water into the liquid ring compressor.

A method for operating a fuel cell system having at least one fuel cell block in accordance with the invention is provided by at least one operating agent for the fuel cell block being compressed by a liquid ring compressor and, after compression, water being separated, in an apparatus for separating water from the operating agent, and being used to cool the fuel cell block, wherein, according to the invention, at least part of the water is fed back into the apparatus for separating water, after the cooling.

A fuel cell system in accordance with the invention has at least one fuel cell block and has at least one liquid ring compressor for compressing an operating agent for the fuel cell block, the fuel cell system has an apparatus for water separation provided between the liquid ring compressor and the fuel cell block in a feed path for supplying the fuel cell block with an operating agent, in which case, according to the invention, a line is provided between the fuel cell block and the apparatus for water separation, via which line part of the water is fed into the apparatus for water separation after flowing through the fuel cell block, in order to cool the fuel cell block.

In this fuel cell system for carrying out this method, an apparatus is thus used which simultaneously carries out two steps of the method, namely separating water from an operating agent for the fuel cell block after compression, and making water available for cooling the fuel cell block. Thus, in contrast to what is known from the prior art, there is no longer any need to use at least two apparatuses to carry out these two method steps. This reduces the number of components which form the fuel cell system, as a result of which the costs for the fuel cell system are also reduced. Furthermore, the control complexity for the fuel cell system is reduced, which also is an advantage of the method according to the invention.

The water for cooling the fuel cell block of the fuel cell system is preferably used, after flowing through the fuel cell block, to operate the liquid ring compressor. This measure ensures that the moistening of the operating agent for the fuel cell block is carried out at the operating temperature of the fuel cell block. This prevents the membranes in the fuel cell block from drying out. Furthermore, a dissipation of the reaction enthalpy from the water for cooling the fuel cell block is additionally carried out by vaporization during the moistening of the operating agent in the liquid ring compressor. Since the water for cooling the fuel cell block is used to operate the liquid ring compressor, such that water is provided by the apparatus for water separation, there is no need for any additional components for operating the fuel cell block.

In a further embodiment of the invention, after flowing through the fuel cell block, part of the water for cooling the fuel cell block is fed from the fuel cell block, via a line, into the liquid ring compressor. A further part of the water for cooling the fuel cell block is thus used to operate the liquid ring compressor.

Other features which are considered as characteristic for the invention are set forth in the appended claims.

Although the invention is illustrated and described herein as embodied in a method for operating a fuel cell system, and a fuel cell system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a schematic block diagram of a fuel cell system according to the invention having at least one fuel cell block and having at least one liquid ring compressor.

DESCRIPTION OF THE PREFERRED EMBODIMENTS

Referring now to the single FIGURE of the drawing in detail, there is shown a fuel cell system 2 with a fuel cell block 4 which is composed of a plurality of fuel cells stacked on top of each other.

The fuel cell block 4 is fed with an operating agent via a feed path 6, 6', for example an anode or a cathode feed path. The operating agent is, for example, oxygen ($O_2$), atmospheric air or hydrogen ($H_2$). The feed path 6, 6' contains, in this order in the flow direction, a liquid ring compressor 9 and an apparatus 10.

The apparatus 10 for separating water from the operating agent after compression in the liquid ring compressor 9 and for cooling the fuel cell block 4 is thus disposed in the feed path 6, 6' between the liquid ring compressor 9 and the fuel cell block 4 of the fuel cell system 2.

After the reaction in the fuel cell block 4, the unused operating agent, which is enriched with process water, is fed out of the fuel cell block 4 via an outlet path 8, 8'. A process water separator 12 is disposed in the outlet path 8, 8' of the fuel cell block 4. The process water which is separated from the unused operating agent is fed into the apparatus 10 via a line 14. A pump 16 is provided in the line 14. The amount of process water fed into the apparatus 10 depends on the water level in apparatus 10.

From the apparatus 10, water for cooling the fuel cell block 4 is fed into the fuel cell block 4 via a line 18. The line 18 includes, in this order in the flow direction, a pump 20 and a heat exchanger 22 for cooling the water.

After flowing through the fuel cell block 4, part of the water for cooling the fuel cell block 4 is once again fed into the apparatus 10, via a line 24, 24'. This measure results in the water being used again to cool the fuel cell block 4.

Furthermore, after flowing through the fuel cell block 4, part of the water for cooling the fuel cell block 4 is branched off the line 24, 24' between the fuel cell block 4 and the apparatus 10, via a line 26, and is made available to the liquid ring compressor 9, in order to operate the liquid ring compressor 9. A valve 28 for controlling the water supply for the liquid ring compressor 9 is provided in this line 26. The water for operating the liquid ring compressor 9 is thus made available from the apparatus 10.

The apparatus 10 is thus suitable for carrying out various method steps for operating the fuel cell system 2. On the one hand, water is separated from the operating agent for operating the fuel cell block 4 after the compression. On the other hand, water is provided for cooling the fuel cell block 4, while, furthermore, the water for cooling the fuel cell block 4, which comes from the apparatus 10, is used for operating the liquid ring compressor 9, after flowing through the fuel cell block 4.

This measure achieves that only one apparatus 10 is used to carry out these method steps. In consequence, the number of components in the fuel cell system 2 is reduced, which also reduces the costs for the fuel cell system 2. By reducing the number of components which form the fuel cell system 2, also the control and regulation complexity for the fuel cell system 2 is reduced.

Furthermore, the operating agent for operating the fuel cell block 4 is always moistened at the operating temperature of the fuel cell block 4, which prevents the membranes from drying out.

The water level in the apparatus 10 can be passed via a signal line 30 as a signal to the pump 16 in the line 14. This measure achieves that there is always enough process water being fed via the line 14 into the apparatus 10 from the process water separator 12, so that enough water is available in the apparatus 10 in order to cool the fuel cell block 4 and

We claim:

1. A method for operating a fuel cell system having a fuel cell block, the method which comprises:
   compressing an operating agent for a fuel cell block with a liquid ring compressor;
   subsequently separating water from the operating agent in an apparatus for water separation;
   cooling the fuel cell block with the water; and
   subsequently feeding back at least a portion of the water into the apparatus for water separation.

2. The method according to claim 1, which comprises using process water from the fuel cell block for cooling the fuel cell block.

3. A fuel cell system, comprising:

a fuel cell block;

a liquid ring compressor for compressing an operating agent for said fuel cell block;

an apparatus for water separation connected between said liquid ring compressor and said fuel cell block in a feed path for supplying said fuel cell block with the operating agent; and a line connected between said fuel cell block and said apparatus, said line feeding water, after flowing through said fuel cell block and cooling said fuel cell block, back into said apparatus.

4. The fuel cell system according to claim 3, further comprising:

a process water separator connected to said fuel cell block; and a further line for feeding process water from said process water separator into said apparatus.

5. The fuel cell system according to claim 3, comprising a further line branching off from said line and opening into said liquid ring compressor for feeding part of the water into said liquid ring compressor.

* * * * *